Sept. 29, 1970  M. B. GARDNER, JR  3,530,680

PRESTRESSED CONDUIT FOR COLD FLUIDS

Filed Feb. 7, 1967  4 Sheets-Sheet 1

INVENTOR.
MARVIN B. GARDNER, JR.

BY
Richard S. Shreve Jr.
ATTORNEY

Sept. 29, 1970     M. B. GARDNER, JR     3,530,680
PRESTRESSED CONDUIT FOR COLD FLUIDS
Filed Feb. 7, 1967     4 Sheets-Sheet 2
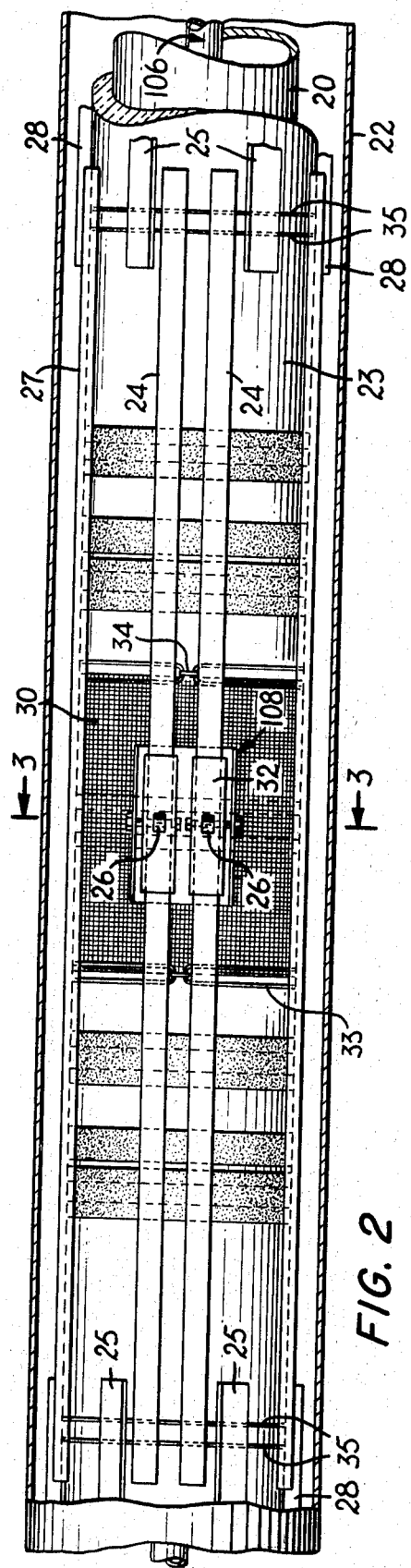
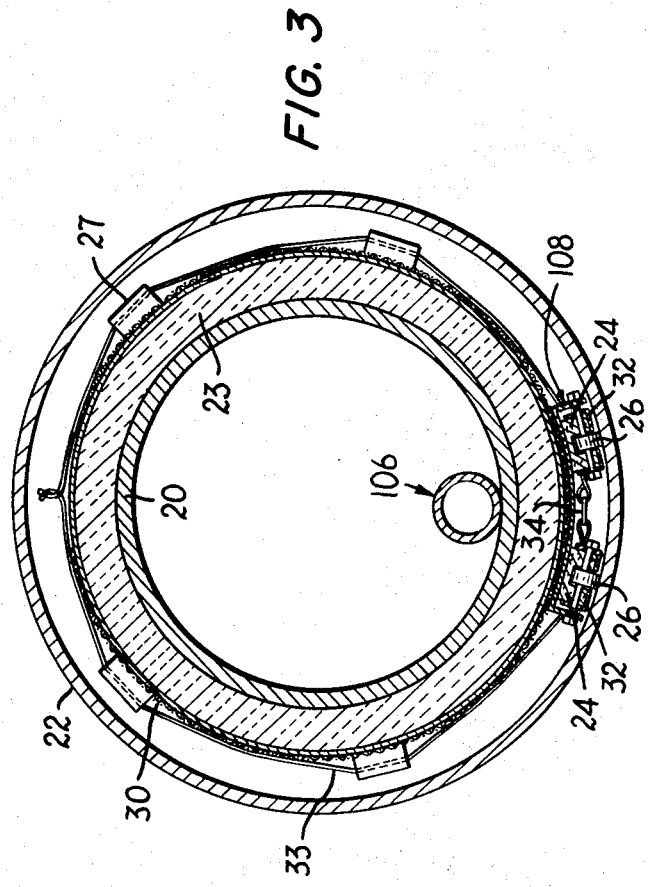
INVENTOR.
MARVIN B. GARDNER, JR.
BY Richard S. Shreve, Jr.
ATTORNEY

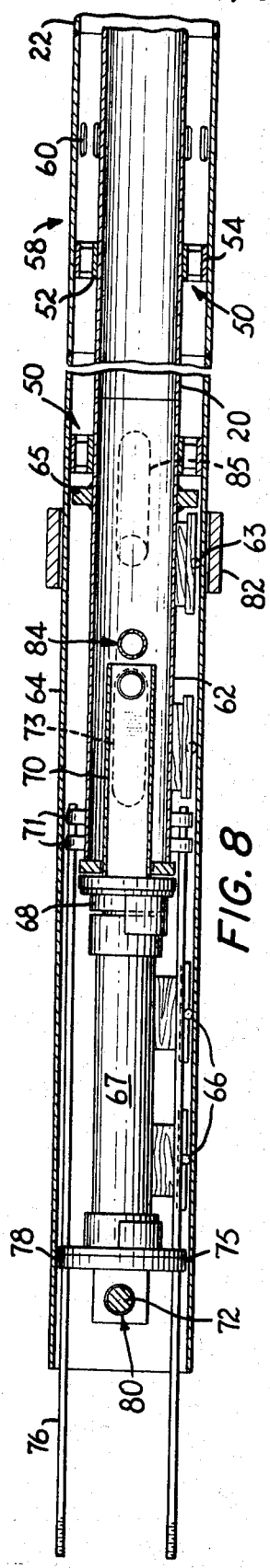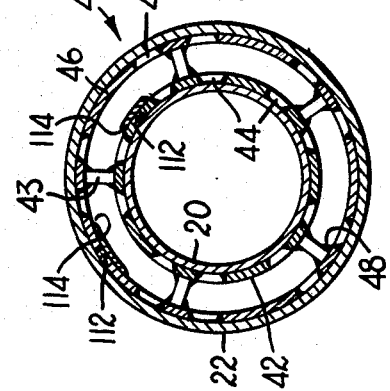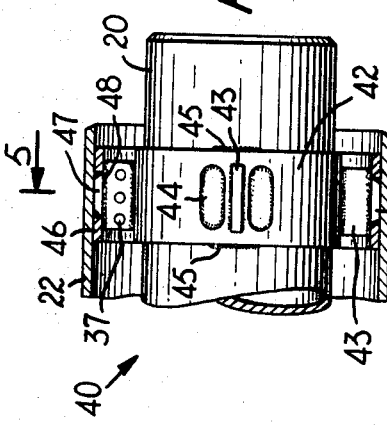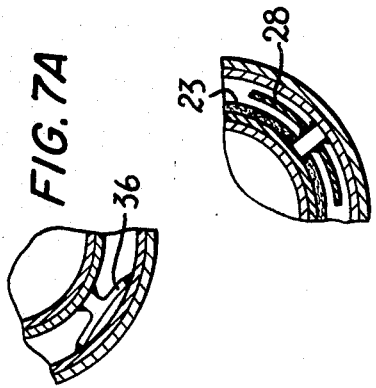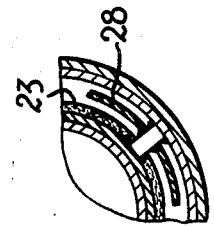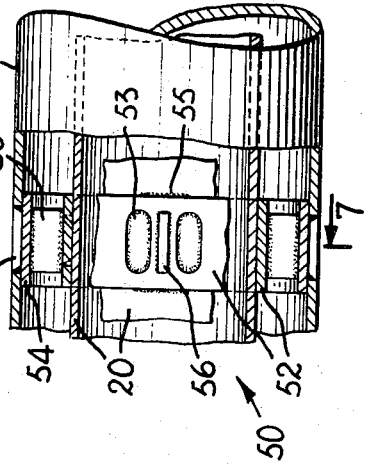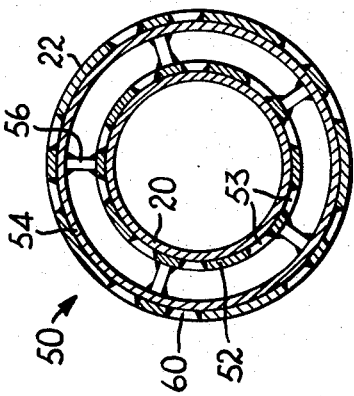

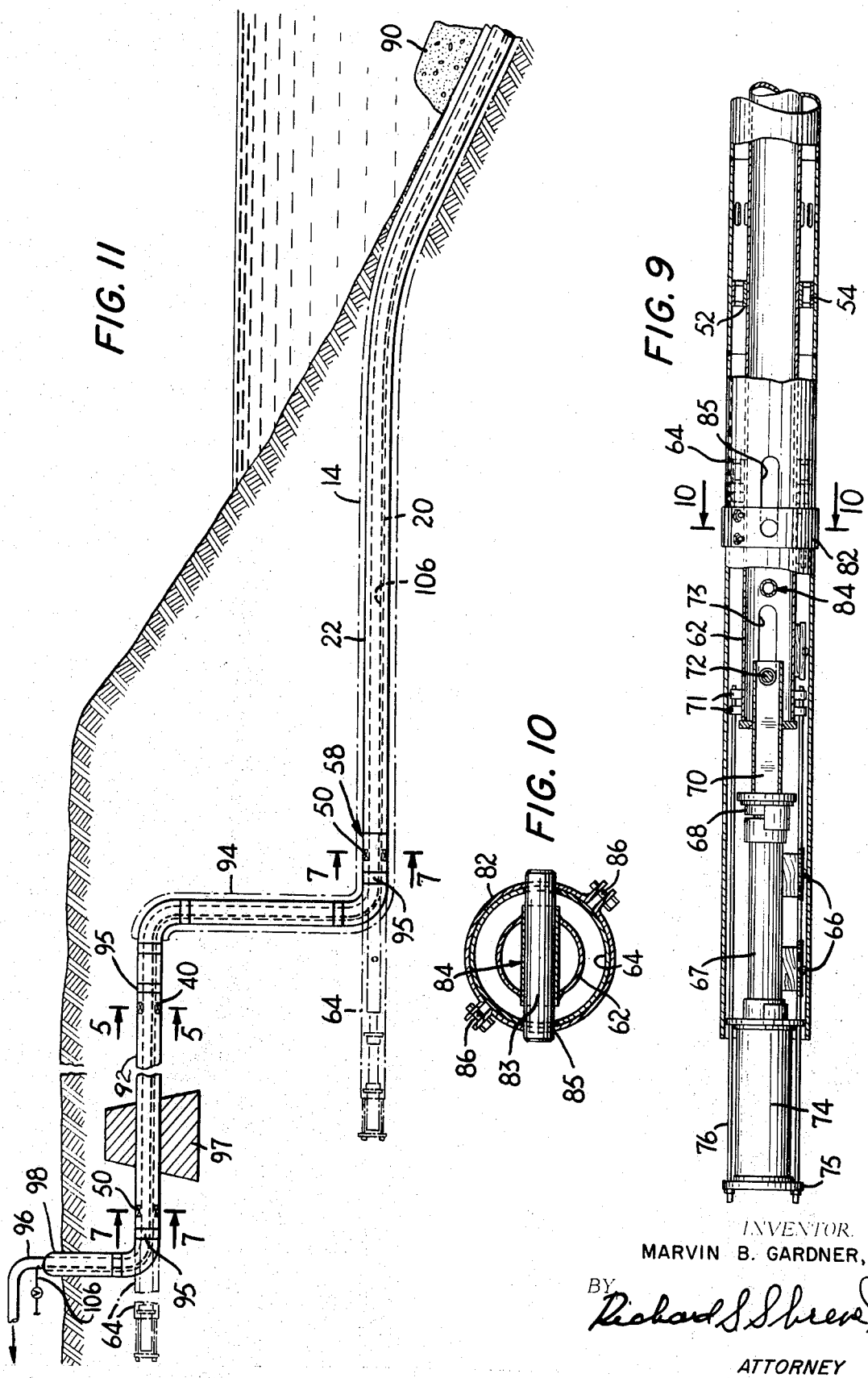

United States Patent Office 3,530,680
Patented Sept. 29, 1970

3,530,680
PRESTRESSED CONDUIT FOR COLD FLUIDS
Marvin B. Gardner, Jr., Roselle Park, N.J., assignor to
The M. B. Gardner Co., Inc., Roselle Park, N.J., a
corporation of New Jersey
Continuation-in-part of application Ser. No. 433,060,
Feb. 16, 1965. This application Feb. 7, 1967, Ser.
No. 614,506
Int. Cl. F16l *7/00, 39/00*
U.S. Cl. 61—72.3                           10 Claims

ABSTRACT OF THE DISCLOSURE

Conduit for refrigerated fluid comprising an inner conduit covered with insulation and having longitudinally overlapping antifriction slats and rollers, and slid into outer conduit with connectors interposed between corresponding ends of the conduits, and the inner conduit longitudinally compressed by jacking with respect to the outer conduit, with the connectors welded to the prestressed conduits by longitudinal lines of welding.

BACKGROUND

This invention relates to prestressed conduits, and more particularly to conduits of this character for conducting fluids at a temperature gradient with respect to ambient media. One example of such fluids is liquid ammonia at −28° F. Other examples are chilled water, liquefied hydrocarbon gases. Oxygen, nitrogen, hydrogen and helium. While this continuation relates primarily to lines conveying cold fluids, the devices, procedures and principles can also be applied to piping systems for conveying heated fluids.

Conduits such as carbon steel, steel alloys, copper and aluminum are subject to thermal expansion or contraction, and for this reason expansion joints, or pipe bends or loops are provided for conduits subject to considerable temperature change. These expansion joints are expensive in construction and installation and subject to leakage and other disadvantages. Expansion bends and loops are also expensive to install and often take up valuable space.

PRIOR ART

The Bond Pat. No. 2,706,496 shows elongated skid bars with rollers, but the bars are not in longitudinally overlapping relation, and have no retainer channels.

The Lee Pat. No. 3,169,576 prestresses an inner pipe, but this is in tension for conducting hot liquid such as molten sulphur, and is done by jacking at the dock end, not on shore.

The Wilson Pat. No. 2,924,245 has longitudinal lugs welded between inner and outer pipes, but the inner pipe is prestressed in tension by hot gases of combination, and these lugs have no inner nor outer bands.

SUMMARY

This application is in part a continuation of my copending application Ser. No. 433,060 filed Feb. 16, 1965 and now abandoned.

The main object of the present invention is to provide a conduit to withstand thermal expansion or contraction without the necessity of expansion joints. Another object is to provide a double walled conduit, in which the forces of expansion of the inner wall are resisted by the outer conduit itself or by external anchors. Another object is to isolate an insulated inner conduit within a water and air tight outer conduit capable of withstanding external pressure. The heat transfer to the inner conduit is low because its insulation remains dry and because there is an air gap and wood slats of low conductivity between the insulation on the inner pipe and the wall of the outer pipe.

Other objects are to facilitate the construction and increase the strength of prestressed conduits of this character.

STATEMENT

According to the present invention, longitudinally overlapping circumferentially spaced antifrictiton means are applied to the outer surface of insulation surrounding an inner conduit, which is slid into an outer conduit with the antifriction means engaging the bottom of the inner surface thereof, connectors are interposed between corresponding ends of the inner and outer conduits, the inner conduit is longitudinally prestressed with respect to the outer conduit or to external anchors, and the connectors are rigidly and permanently secured to the conduits for maintaining the inner conduit in prestressed condition. Preferably the fluid conducted by the inner conduit is a liquid at low temperature, the prestressing comprises compression in the inner conduit applied by jacking.

The connectors are preferably secured by welding at least in part in the direction longitudinally of the conduits. The connectors preferably comprise inner and outer bands with radial webs or plates therebetween having longitudinal edges welded thereto, the inner bands being welded to respective end portions of the inner conduit, one of said outer bands being welded to one end of said outer conduit, all before prestressing of the inner conduit, and the other of said outer bands is welded to the other end of the outer conduit after such prestressing. The antifriction means preferably comprise slats with ball bearing rollers journaled therein.

Preferably the conduit extends from inshore to a dock end anchor and terminates in a riser. The bottom of the riser and the dock end of the conduit are carried by a sled on the bottom. The sled is pulled toward the precast concrete anchor, and the riser and offshore end are supported by and secured to the anchor.

In the drawings

FIG. 2 is an inverted plan view, partly in longitudinal section, of a length of double walled conduit, before prestressing thereof, for the installation shown in FIG. 1;

FIG. 3 is a transverse section taken along the line 3—3 of FIG. 2;

FIG. 4 is a longitudinal section through a starter type of connector ring for the conduits;

FIG. 5 is a transverse section through FIG. 4;

FIG. 6 is similar to FIG. 4, showing a finisher type of connector ring;

FIG. 7 is a transverse section through FIG. 6;

FIG. 7A is a partial section showing a modification;

FIG. 7B is a similar view of a further modification;

FIG. 8 is a section of the inshore end of the conduit, showing the hydraulic jack in position for prestressing the conduits in compression;

FIG. 9 is similar to FIG. 8, but showing the position of the parts for prestressing in tension;

FIG. 10 is a section taken along the line 10—10 of FIG. 9; and

FIG. 11 is a view similar to FIG. 1, but showing the inshore or delivery end of the same conduit.

Figure 1:
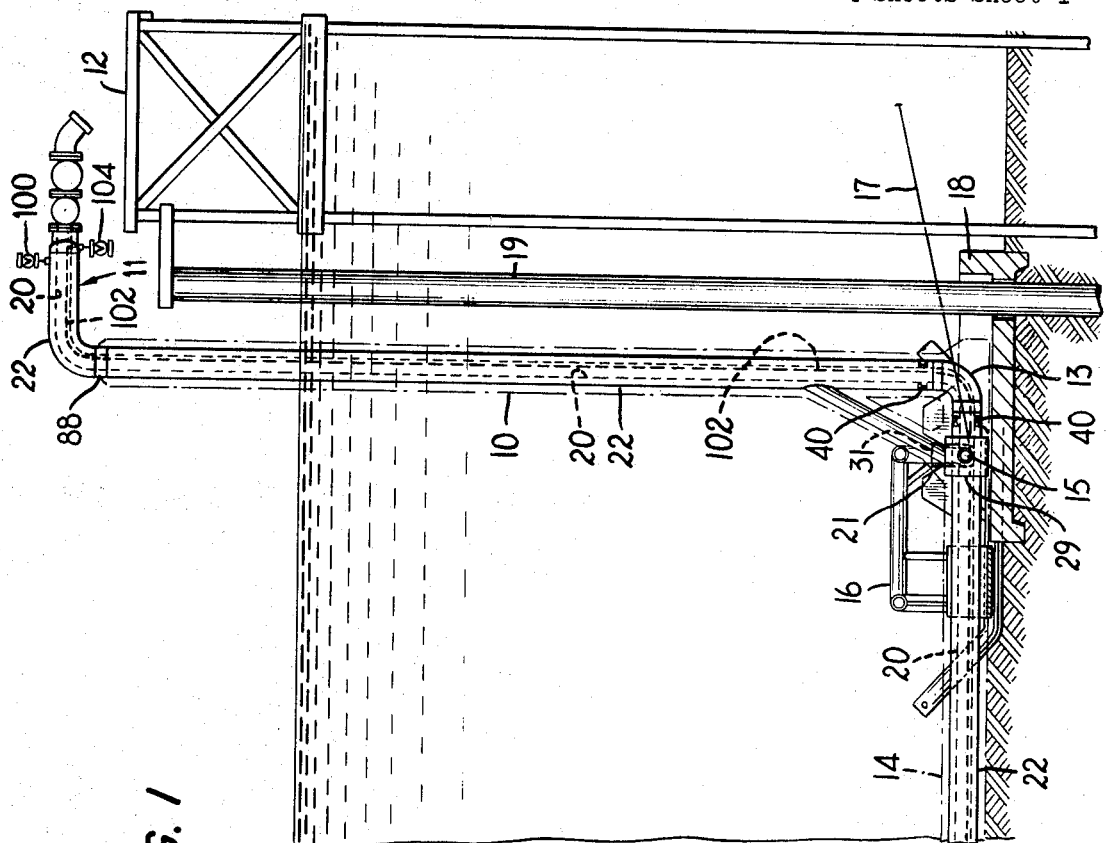
FIG. 1 is a schematic diagram of the offshore or docking end of a prestressed submerged conduit for unloading liquid ammonia from a ship at an offshore dock, according to the preferred embodiment of the present invention.
Figure 1:
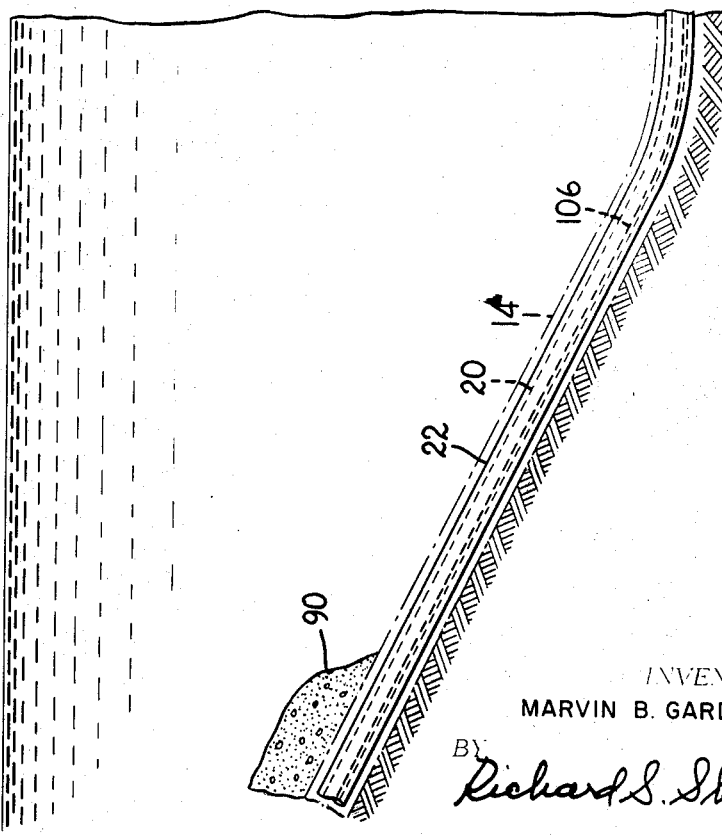

The invention has been employed to install a prestressed submerged pipeline system as shown in FIGS. 1 and 11, to convey liquid ammonia at −28° F. from a dock some 4800 feet offshore, to an onshore below grade section 265 feet in length of the same line, which in turn connects to an above grade non-prestressed single line which conveys the ammonia to a refrigerated storage tank.

As shown in FIG. 1, the conduit comprises a riser section 10 having at the top thereof a horizontal entrance section 11 which receives the fluid to be conducted from a suitable hose or other connection from a ship not shown at the offshore dock 12. The riser section 10 is connected by a base elbow to the offshore end of the main conduit 14, which is provided with a reinforcing collar 29 having traction hooks or horns 15. The assembly just described is inserted in the cradle of a launching sled 16, and secured longitudinally thereto by two journal plates 31 each passing over the horns 15 and attached to the sled frame. The cable hitch for pulling is made to the horns 15 outside of the journal plates by a cable 17 from a winch on an anchored barge not shown.

The bottom of the cradle is close to the level of the sled runners, effecting a low center of gravity for the pipeline. This also permits the line to burrow a trench in the sea floor as it is pulled toward the offshore dock. Clearance is provided on each side of the cradle containing the lead section so that it can pass by small rocks, or other obstructions without upsetting.

A precast anchor support 18 has already been installed at the dock, secured in position by a pile 19 and by the imbedment of the integral wall in the mud. As the line is pulled by the cable 17, the sled is raised near the dock, and is moved forward into the foundation. The clearance between the pipe cradle and the two runners of the sled 16 is such that the sled and riser pass over the precast anchor 18, until the horns 15 are over the notches 21 in the side walls of the anchor 18, at which position the assembly is lowered and aligned. Movement of the line is limited largely to the clearance of the horns 15 in the notches 21 and to the clearance between the sleeve in the precast anchor and the anchor pile. The weight of the dock riser is localized at its base by an oversized concrete encasement that fits within the anchor walls and prevents the leading section from bearing on the anchor except in the area under the riser. This results in the anchor being loaded near its center of gravity to improve stability.

As shown in FIGS. 2 and 3, the conduit comprises an inner conveying pipe 20 and an outer protective pipe 22. A small chilling line 106 is provided inside the inner pipe for at least part of the system. The inner pipe 20, which conducts for example liquefied ammonia, is covered with a premolded sectional insulation 23. The outer pipe 22 is coated, wrapped, and concrete jacketed. For freedom in prestressing, as well as to protect the insulation from damage and to facilitate insertion thereof into the outer pipe, the inner pipe has antifriction slats, preferably of wood, applied to the outside of the insulation in longitudinally overlapping and circumferentially spaced relation.

A pair of such slats 24 are mounted on the underside of the inner pipe 20, in longitudinally overlapping relation with adjacent pairs of slats 25. The slats 24 and 25 each have a reinforcing formed metal channel 32 having a cut out and drilling to match the morticing and drilling of the slats. A ball bearing roller 26 is journaled within the slat and reinforcing channel. Other slats 27 and 28 are similarly applied to the top and sides of the inner pipe 20. To facilitate the application and spacing of the slats, the same are secured as by stapling to a net fabric 30, preferably of plastic laminated screen.

The slats 24 and 25 are secured in position in circumferentially spaced relation by a binder element such as a wire loop 33 having a link 34 between the bottom slats to hold them in position, and by separate circumferential loops 35 which pass through corresponding drilled holes near the ends of overlapping slats 24–25 and 27–28. The roller bearing 26 is fixed to the reinforcing channel 32 and to the slats 24–25 by a common cap screw bolt. As an alternate a formed metal channel cradle 108 having outward flanges my be used to help secure the bottom slats 24–35 in position.

The inner pipe is first pulled in tension and then compressed to the desired prestress. In operation, as the inner pipe cools down, the compressive forces are relieved and a tensile stress develops. In prestressing the inner pipe is first pulled through its tensile stress range and then compressed through its compressive stress range, and finally attached to the outer pipe. The tensile and compressive stresses are kept below the proportional limit of the material.

In constructing the line, double random lengths or precut lengths of the outer pipe are welded together to make sections as long as the launching area permits. The inner pipeline is also composed of double random or precut lengths. One of such lengths is first insulated and then the wooden slat assemblies are applied. The insulated and slatted inner pipe is inserted into the end of the casing with the ball bearing rollers protruding about a quarter of an inch below the bottom of the reinforcing channels 32 on the bottom two slats 24 and 25. This projection of the rollers below the reinforcing channel permits them to ride over butt welds joining the lengths of the outer pipe.

Before such length of the inner pipe is completely inserted, another insulated and slatted length is welded on. The bare section at the weld area is insulated and short slats installed over the insulation. Additional lengths of the inner pipe assembly are welded on until the casing has been filled with the inner pipe assembly. A small chilling line 106 is installed within the insulated line 20, through each section of the pipe assembly.

To facilitate the prestressing operation, and to distribute the compressive and tensile loads so that excessive local stress will not occur at the area of attachment of the radial webs to the pipes, connector rings are provided, a starter type 40 as shown in FIGS. 4 and 5, and a finishing type 50 as shown in FIGS. 6 and 7.

The starter type of connector ring permits attaching of the two pipes together without providing welding ports in the outer pipe. This ring comprises two parts: first a spider portion comprising an inner split band 42 having longitudinal webs 43 welded thereto and radiating therefrom, and oval ports 44 on each side thereof. The inner split band 42 is slipped over the exposed end of the inner pipe 20 and welded thereto through the oval ports 44, the longer sides of these ports forming longitudinal lines of weld. Also both edges of the band 42 in a short region adjacent to the web 43 are welded to the pipe 20 as at 45.

The second portion of the starter type of prestress ring comprises an outer split band 46, which is welded to the inside of the corresponding end of the outer pipe 22, the band 46 having oval ports 47 therein for this purpose and also forming longitudinal welds. After the bands 42 and 46 have been welded to their respective pipes, relative movement of the two pipes is provided, to bring the bands 42 and 46 into radial and longitudinal alignment. As shown in FIG. 4, the outer ends of the webs 43 are accessible for welding thereof to the outer band 46 as at 48. This starter type of ring is installed at the offshore end of the section to be prestressed.

The outer half 46 of the starter type prestress ring 40 distributes the heat transmitted through the radial lugs or webs 43 over a larger area of the outer pipe than would be the case if the webs were welded directly to the outer pipe. The length of this outer piece 46 can be increased to result in a greater area distribution of the heat with corresponding less intensity to or from the outer pipe. The outer ring 46 of the prestress ring 40 reinforces the outer pipe and distributes the longitudinal forces around the outer pipe.

The outer band 46 can be attached to an external anchor either directly or through the wall of the outer pipe.

This will permit a thinner wall outer pipe to be used and the longitudinal force will be restrained by the external anchors rather than by the outer pipe. The inner band 42 reinforces the inner pipe and distributes the longitudinal forces around the inner pipe.

To reduce the heat conduction through the webs 43 or 46 (i.e., a higher temperature at the outer pipes) various modifications can be made to the lugs or webs. The material of the plates 43 can be selected having a low heat conductivity such as nickel alloy steel. The path of heat transfer can be made longer and the heat or cold transmitted over a greater area of the outer pipe by modifying the configuration of the webs or lugs as shown at 36 in FIG. 7A. Holes 37 can be provided in the web plate such as 43 near the inner pipe to reduce the heat transfer area. Metal heat radiating fins 38 as shown in FIG. 7B can be attached to the webs to radiate heat to the annular space outside of the insulation 23 on the inner pipe to reduce heat transfer to or from the outer pipe.

The oval welding ports such as 44 permit the use of small size fillet welds to develop the required strength which results in minimum penetration and grain structure change to the metal of the inner pipe. The oval ports also permit the attachment fillet welds to be continuous and thereby not subject to end cracking. After installation the split bands 42 and 46 are made essentially integral by welding the splice plates 112 overlapping the gap in the band by a fillet weld as at 114.

The finishing connector ring 50 shown in FIGS. 6 and 7 differs in that the inner band 52 is not split, and the outer band 54 also is not split, and is imperforate, having no welding ports therein. This ring is prefabricated as a whole, in that the webs 56 are welded to both the inner and outer bands 52 and 54 before the ring is installed. This prefabricated ring is slid over the inner pipe 20 and the inner band 52 welded thereto along the ports 53 and welds 55.

To prepare for prestressing, as shown in FIG. 8, a short section 58 of outer pipe having oval ports 60 in a precalculated position, is installed over the inner pipe 20, and welded to the inshore end of the outer pipe 22. A moving backstop or coupling 62 is mounted on rollers 63 in a jack housing 64, and having a fixed guide ring 65 and a loose guide ring such as a ring 50. The inner pipe 20 extends a distance beyond the end of the outer pipe section 58 a distance equal to the setback of the moving backstop or coupling 62 from the end of the casing 64 of the jack assembly. The coupling 62 is moved forward in the jack housing 64 so that its end can be welded to the inner pipe 20. After the weld has been completed, the casing 64 of the jack assembly is moved forward and welded to the short outer pipe 58.

Mounted in the jack housing 64 on rollers 66 is a jack comprising a cylinder 67 and a ram 68. Interposed between the ram 68 and the coupling 62 is a stub column 70. The jack and stub column are moved backward as shown in FIG. 9, so that a steel pin 72 can be inserted through a suitable abutment opening in the jack housing and a steel sleeve bearing in the base of the stub column 70. Elongated slots 73 on each side of the moving backstop 62 permit the pin 72 to be inserted through the backstop which is free for motion when the inner line is pulled. The length of this slot 73 corresponds to the maximum expected elongation of the line under the tensile load.

After the pin has been inserted, a dummy spool piece 74 is installed and held in position by a head plate 75 bolted on tension rods 76, which are secured to the coupling 62 by two rings 71. The jack pressure is then exerted on the spool piece 74 and the tension rods 76. As the ram of the jack begins to be extended, the rods 76 take a tensile force and a corresponding compressive load is transmitted through the stub column 70 and pin 72 to the casing 64 of the jack assembly and thereby to the outer pipe 22.

Thus the rods 76 pull the coupling 62 and the attached inner pipe 20 toward the free end of the assembly, exerting tension in the inner pipe 20, thereby testing the welds and relieving residual stresses therein. At the same time, the casing 64 and the outer pipe 22 undergo a compressive load. Upon release of the load, the components return toward their initial relative positions. However, frictional drag may prevent a complete return.

To reverse the procedure, as shown in FIG. 8, for compressing the line, the pin 72 is removed from its forward position, and the stub column 70 with its integral jack head plate 68 and the jack 67 are moved forward, so that they rest against the end plate of the moving backstop 62. The rod tension plate 75 and the dummy spool piece 74 are removed, and the jack base compression piece 75 is installed over the rods 76, and the pin 72 is inserted through the bearings in the casing and the sleeve 80 in the gusset of the back compression piece. As the ram of the jack begins to be extended, the casing 64 and the outer pipe 58–22 pick up the tensile load, and the moving backstop 62 and attached inner pipe 20 undergo a compressive load. As the load of the jack increases, the inner pipe 20 moves forward until the outer band 54 of the finishing prestress ring 50 closes the oval ports in the casing, and are in the desired location. Fillet welds are installed through these ports to attach the two together locking in the prestresses.

As a safety device as show in FIG. 10, a heavy clamping collar is provided, through which a pin 83 is inserted into a sleeve 84 in the coupling 62. The outer housing 64 has slots 85 so that the collar 82 can move freely with the coupling 62. During compression when the sleeve 84 has advanced sufficiently forward, a pin is inserted engaging the collar 82. When the desired position of prestress is reached, the collar 82 is secured by tightening the bolts 86, and by small fillet welds if desired, to prevent creep back of the prestressed pipe during the welding operation at the oval ports 60.

Referring again to FIG. 1, the inner pipe 20 of the riser 10 is supported from the outer pipe 22 at its base by a starter type prestress ring 40. The inner pipe is hot sprung by welding up the assembly except for the split sleeve 88 which is cut short in length equivalent to the desired hot spring. The inner pipe 20 of the horizontal run 11 is deflected downward toward its base and the casing section 22 is forced downward to close a precalculated gap at one end of the split sleeve 88, and the closure circumferential butt weld is made while the horizontal run remains deflected. When the line is placed in service, the inner pipe in the riser shortens in length toward the anchor formed by the ring 40 near the base elbow 13, relieving the locked in hot sprung bending stress.

The lead section of the line 14 has a prestress ring 40 therefor installed at its dock end. As the line assembly 14 is pulled toward the dock 12 by the cable 17, sections are welded on. First the chilling line 106 then the inner pipe 20 is welded, then the gap for welding is insulated. The outer pipe 22 is then moved forward and welded. The joint is inspected, coated, wrapped, and concrete jacketed. This is repeated until the line reaches the dock.

As shown in FIG. 11, after the assembly line 14 has been anchored at the dock, it is also anchored at the shore near its exposed end by installing a heavy back-fill as shown at 90. The finisher type of prestress ring 50, the short section of casing 58 with the oval welding ports 60 and the hydraulic jack assembly 64 are then installed. The line 14 is then prestressed to a calculated shrinkage after it has first been pulled through its tension range.

As shown in FIGS. 1 and 11, the outer pipe 22 is essentially anchored at both ends; at the dock by the precast anchor 18 and at the shore by heavy back-fill 90. Although a small motion of the outer pipe relative to the precast anchor is possible due to the clearance of the horns 15 in the slots 21, the outer pipe between the two anchors is essentially unaffected by the longitudinal prestressing forces. The section of the outer pipe between the shore anchor 90 and the jack assembly does however undergo the full longitudinal force during the prestressing operations. The use of external anchors relieves the outer pipe length between the anchors of the prestressing and operating longitudinal forces to which the inner pipe is subjected.

The onshore section 92 is assembled in the same manner as the off shore section 14. At one end a starter type prestress ring is installed, and at the other end a finish type prestress ring 50, a short outer section 58 with oval welding port 60 and the hydraulic jack in the housing 64 are installed.

In this case the inner pipe is prestressed using the entire length of the outer pipe between the starter and the finishing type of prestress rings to supply the resisting elastic force. The assembly is in an open trench set up on wood blocks at ten to twenty foot intervals. The inner line is first pulled in tension and the outer pipe withstands the compressive load without buckling due to the concentricity of the lines and the uniform gravity loads between the wood blocks as support points and the relatively low compressive and bending stresses. The inner line is then compressed and the outer casing withstands the corresponding tensile loads. The outer pipe is lengthened by the prestress load, and the inner pipe is shortened by the prestress load. When the desired prestress is attained, the two pipes are attached together by welding through the oval ports of the finisher type prestress ring 50.

The two prestressed portions 14 and 92 are then joined together by a short unstressed section 94. Connections are made to the prestressed sections by burning off the outer pipe an inch or more from the prestress ring and the inner pipe several inches beyond the burn off of the outer pipe.

Adjoining sections of the double pipe system have a like end condition. In making the connection, the inner pipe is first welded, inspected, and insulated. To join the outer pipes a split sleeve 95 fabricated from the outer pipe is used to close the gap and provide a completely welded tight outer pipe that would contain any leakage from the inner pipe. The prestressed pipeline system is handled with conventional pipeline equipment in shifting its position and lowering it into the trench for back filling.

The short riser at the shore end is installed and connected to the shore section 92 which passes under a roadway. The shore section 92 is connected to a single above grade insulated non-prestressed line 96. An anchor 97 is provided on the outer end of the shore section near the end where the connection is made to the above grade section.

When the line is placed in service and the compressive stress in the inner pipe 20 is relieved, the stored elastic energy in the outer pipe 22 will compress the inner pipe if motion of the assembly toward the anchor 97 develops. Any compression of the inner pipe caused by motion induced by the elastic energy in the outer pipe will extend the temperature drop in the inner pipe before a tensile stress develops as it is cooled toward the temperature of the fluid to be conveyed.

Dry air or inert gas is injected as at 98 into the annular space between the insulation on the inner pipe and the wall of the outer pipe 11. This annular space can be vented to the atmosphere as at 100 in FIG. 1. A positive pressure is maintained in the annular space such that if any leak were to occur in the inner pipe, or flooding by water due to an accident during installation, the liquid would be forced up the drain tube 102 installed within the annular space in the riser, and out through the valve 104. Alternately a vacuum could be induced in the annular space to reduce heat transfer.

In order to cool down the line and thus prevent evaporation when the ammonia reaches the storage tank, liquid ammonia is forced through a small chilling line 106, as shown in FIG. 11, which line is inside the inner conveying line 20. This small precooling line extends from the start of the underground section to the area of the prestress ring 40 at the dock anchor support 18 in FIG. 1. The end of this line at the dock anchor end is free for longitudinal motion, and is not prestressed with the inner pipe. The ammonia forced through this small line is vaporized, cooling the inner conveying line. The ammonia vapors coming out of the end of the small inner line pass back through the inner conveying pipe to the storage tank compressing equipment where they are condensed to a liquid and returned to the storage tank.

The piping system for conveying the liquid ammonia at $-28°$ F. is composed of a normalized ASTM A–106 Gr. A carbon steel conveying pipe and an outer pipe of carbon steel conforming to API–5L Gr. B. The small internal chilling line is also of carbon steel conforming to ASTM–A106 Gr. B. The prestressing rings are also fabricated from low carbon impact test steel such as ASTM–A201.

For conveying fluids at lower temperature, piping of nickel alloy steel would be suitable. For conveying liquefied methane at temperatures down to $-400°$ F. a 9½ percent nickel alloy steel pipe would be suitable. This material has highly favorable properties, namely a relatively low coefficient of thermal expansion, a high elastic limit and good impact properties at low temperatures. Aluminum and austenitic stainless steels are suitable piping materials for conveying fluids at extremely low temperatures in which prestressing principles can be applied to compensate for longitudinal thermal stress.

What is claimed is:

1. Method of manufacturing a riser of a conduit for conducting fluids at a temperature gradient to ambient media, which comprises securing a connector ring between inner and outer conduits near the bottom thereof, hot springing the inner pipe by welding up the assembly except for a precalculated gap near the top of the outer conduit which is cut short in length equivalent to the desired hot spring, deflecting the horizontal run of said inner pipe downward toward its base, forcing the outer conduit downward to close said precalculated gap, and welding said outer conduit while said horizontal run remains deflected and gap in outer conduit is forced closed.

2. Method of manufacturing a conduit for conducting fluids at a temperature gradient below ambient media, which comprises sliding an inner conduit into an outer conduit, securing said inner conduit and outer conduit together at one end portion thereof, longitudinally prestressing said inner conduit to shorten the same to a calculated shrinkage with respect to said outer conduit by chilling refrigeration thereof below the freezing temperature of water, and rigidly and permanently securing said conduits at the other end portion thereof for maintaining them in said prestressed relation.

3. Method of manufacturing a jointed conduit for conducting fluids at a temperature gradient below ambient media, which comprises sliding a jointed inner conduit inot a jointed outer conduit, securing said inner and outer conduits at one end portion thereof, longitudinally prestressing said jointed inner conduit with respect to said jointed outer conduit by tension in said jointed inner conduit followed by compression in the same to a calculated shrinkage, both applied by jacking, whereby the joints in the line are tested through both the tensile and compressive ranges before it is placed in service, and rigidly and permanently securing said conduits at the other end portion thereof for maintaining them in said prestressed relation.

4. Method of manufacturing a conduit for conducting fluids at a temperature gradient to ambient media, and employing connector rings comprising inner and outer bands with radial webs therebetween having longitudinal edges welded thereto, which comprises sliding an inner conduit into an outer conduit, welding said inner bands to respective end portions of said inner conduit, welding one of said outer bands to one end of said outer conduit, thereafter longitudinally prestressing said inner conduit to a calculated shrinkage with respect to said outer conduit, and thereafter welding the other of said outer bands to the other end of said inner conduit after the prestressing of said inner conduit.

5. Method of manufacturing a conduit for conducting fluids at a temperature gradient to ambient media, which comprises sliding an inner conduit into an outer conduit, securing said inner and outer conduits at one end portion thereof, longitudinally prestressing said inner conduit to a calculated shrinkage with respect to said outer conduit by securing a jack housing to said outer conduit in coaxial relation, and exerting counteractive forces between said inner conduit and said housing through said coupling by a jack in said housing, and rigidly and permanently securing said conduits at the other end portion thereof for maintaining them in said prestressed relation.

6. Method of manufacturing a conduit for conducting fluids at a temperature gradient to ambient media, which comprises sliding an inner conduit into an outer conduit, securing said inner end outer conduits at one end portion thereof, longitudinally prestressing said inner conduit to a calculated shrinkage with respect to said outer conduit, rigidly and permanently securing said conduits at the other end portion thereof for maintaining them in said prestressed relation, extending said conduit from inshore to an offshore anchor support and terminating in a riser, submerging the bottom of said riser and the offshore end of said conduit carried by a sled on the bottom, pulling said conduit, riser and sled toward said anchor support, and securing said sled and said riser and offshore conduit end to said anchor support.

7. Conduit for conducting fluids at a temperature gradient to ambient media, which comprises an inner conduit and an outer conduit, a connector ring secured between said conduits at one end portion thereof, said inner conduit being prestressed to a calculated shrinkage with respect to said outer conduit, another connector ring rigidly and permanently secured thereto at the other end for maintaining them in prestressed relation, in which said connectors each comprise an inner band outside of said inner conduit, an outer band inside said outer conduit, radial plates in axial planes between said rings and welded thereto, and the outer conduit has ports therein with longitudinal edges welded to said outer band.

8. Conduit for conducting fluids at a temperature gradient to ambient media, comprising an inner conduit and an outer conduit, antifriction means secured to the outside of said inner conduit, with slats in overlapping staggered relation, reinforcing channels for said slats, ball bearing rollers journaled in said channels and received in said slats, said inner conduit being slid into said outer conduit with said rollers engaging the bottom of the inner surface thereof, said conduits being secured together at one end portion thereof, said inner conduit being longitudinally prestressed with respect to said outer conduit, and said conduits being secured together at the other end portion thereof for maintaining them in prestressed relation.

9. Conduit as claimed in claim 8, in which a longitudinally extending channel has a web, fitting the outside of said inner conduit and flanges projecting therefrom outwardly to receive a pair of said slats therebetween.

10. Conduit for conducting fluids at a temperature gradient to ambient media, comprising an inner conduit and an outer conduit, said inner conduit being slid into said outer conduit and engaging the bottom of the inner surface thereof, said conduits being secured together at one end portion thereof, said inner conduit being longitudinally prestressed with respect to said outer conduit, said conduits being secured together at the other end portion thereof for maintaining them in prestressed relation, said outer conduit having horns on a reinforcing collar, in combination with a sled having a cradle receiving said conduit, said horns being journaled in plates in said sled.

References Cited

UNITED STATES PATENTS

| | | | |
|---|---|---|---|
| 2,156,395 | 5/1939 | Klouman | 285—286 X |
| 2,475,635 | 7/1949 | Parsons | 138—248 X |
| 2,696,835 | 12/1954 | Kaiser | 138—113 X |
| 3,169,576 | 2/1965 | Lee et al. | 138—113 |
| 3,379,027 | 4/1968 | Mowell et al. | 61—723 X |
| 3,380,259 | 4/1968 | Rubenstein | 61—72.2 |

JACOB SHAPIRO, Primary Examiner

U.S. Cl. X.R.

138—113, 148; 285—286